US012644478B2

(12) United States Patent
Winkler et al.

(10) Patent No.: US 12,644,478 B2
(45) Date of Patent: Jun. 2, 2026

(54) CYLINDER/PISTON ASSEMBLY WITH ECCENTRIC PISTON ROD

(71) Applicant: Weber-Hydraulik GmbH, Güglingen (DE)

(72) Inventors: Torsten Winkler, Pfaffenhofen (DE); Ralf Naumann, Pfaffenhofen (DE)

(73) Assignee: Weber-Hydraulik GmbH, Güglingen (DE)

( * ) Notice: Subject to any disclaimer, the term of this patent is extended or adjusted under 35 U.S.C. 154(b) by 48 days.

(21) Appl. No.: 18/853,194

(22) PCT Filed: Jan. 31, 2023

(86) PCT No.: PCT/EP2023/052221
§ 371 (c)(1),
(2) Date: Oct. 1, 2024

(87) PCT Pub. No.: WO2023/193970
PCT Pub. Date: Oct. 12, 2023

(65) Prior Publication Data

US 2025/0250997 A1 Aug. 7, 2025

(30) Foreign Application Priority Data

Apr. 8, 2022 (DE) ..................... 10 2022 108 652.6

(51) Int. Cl.
*F15B 15/28* (2006.01)
*F15B 15/14* (2006.01)

(52) U.S. Cl.
CPC ...... *F15B 15/2861* (2013.01); *F15B 15/1414* (2013.01); *F15B 15/1471* (2013.01); *F15B 15/1457* (2013.01)

(58) Field of Classification Search
CPC .............. F15B 15/1414; F15B 15/1471; F15B 15/2861
See application file for complete search history.

(56) References Cited

U.S. PATENT DOCUMENTS 679,421 A * 7/1901 Halsey .................. B60T 13/162 137/596.2
3,145,628 A * 8/1964 Medley ............... F15B 15/1414 92/244

(Continued)

FOREIGN PATENT DOCUMENTS

CN 1053954 C 6/2000
DE 8028932 U1 10/1981

(Continued)

*Primary Examiner* — Matthew Wiblin
(74) *Attorney, Agent, or Firm* — Volpe Koenig

(57) ABSTRACT

In a cylinder/piston assembly including a hydraulic cylinder and a piston which is sealingly mounted and longitudinally movable within the hydraulic cylinder and which, at least on one side, bears a piston rod, wherein the hydraulic cylinder has a cylinder barrel of circular cross section which is closed at both sides by in each case one end piece, and the piston rod extends along an axis that is eccentric with respect to the cylinder barrel, a cylindrical element is provided which is anchored on the two end pieces and which extends through the piston along a second axis which is eccentric with respect to the cylinder barrel and parallel to the first axis.

9 Claims, 4 Drawing Sheets

(56) References Cited

U.S. PATENT DOCUMENTS

| | | | | |
|---|---|---|---|---|
| 3,146,684 | A * | 9/1964 | Vanderhoof | F15B 15/1414 92/244 |
| 3,979,999 | A * | 9/1976 | Emenaker | F15B 15/261 92/33 |
| 4,719,847 | A * | 1/1988 | Blatt | F15B 15/1414 92/168 |
| 2002/0088343 | A1* | 7/2002 | Schult | F15B 15/1414 92/165 R |
| 2018/0135620 | A1* | 5/2018 | Gubbins | F04B 53/147 |
| 2018/0298926 | A1* | 10/2018 | Suzuki | F15B 15/1438 |
| 2019/0170167 | A1* | 6/2019 | Odaka | F15B 15/1447 |

FOREIGN PATENT DOCUMENTS

| | | | |
|---|---|---|---|
| DE | 8433321 | U1 | 3/1986 |
| DE | 3744628 | C2 | 6/1990 |
| DE | 4112997 | A1 | 10/1992 |
| DE | 202019101493 | U1 | 6/2020 |
| EP | 1176318 | A1 | 1/2002 |
| FR | 2124200 | A1 | 9/1972 |
| JP | H09108844 | A | 4/1997 |

* cited by examiner

CYLINDER/PISTON ASSEMBLY WITH ECCENTRIC PISTON ROD

CROSS-REFERENCE TO RELATED APPLICATIONS

This application is a 371 National Phase of PCT/EP2023/052221, filed Jan. 31, 2023, which claims priority to German Patent Application No. 10 2022 108 652.6, filed Apr. 8, 2022, both of which are incorporated herein by reference as if fully set forth.

TECHNICAL FIELD

A cylinder/piston assembly having a hydraulic cylinder and a piston which is sealingly mounted and longitudinally movable within the hydraulic cylinder and which, at least on one side, bears a piston rod, wherein the hydraulic cylinder has a cylinder barrel of circular cross section which is closed at both sides by in each case one end piece, and the piston rod extends along an axis that is eccentric with respect to the cylinder barrel.

BACKGROUND

A differential cylinder having an eccentric piston rod is known for example from CN 1053954 A. The eccentric arrangement of the piston rod is intended to provide an anti-rotation action. However, when an external torque is applied, transverse forces act on the mounting of the piston rod on the guide pieces, which can lead to wear of the seals and to leaks.

SUMMARY

It is an object of the invention to specify a cylinder/piston assembly having an improved anti-rotation action.

Said object is achieved by a cylinder/piston assembly having one or more of the features described herein. Advantageous refinements can be found in the description and claims that follow.

According to the invention, in a cylinder/piston assembly of the type mentioned in the introduction, a cylindrical element is provided which is anchored on the two end pieces and which extends through the piston along a second axis which is eccentric with respect to the cylinder barrel and parallel to the first axis. The cylindrical element may for example be a rod or a pipe. The anchoring of the cylindrical element on the end pieces, and a sliding, sealed movable mounting of the cylindrical element in a corresponding bore of the piston, provide a torque support for the piston with respect to the hydraulic cylinder.

In particular in the case of a tubular design of the cylindrical element, said element may alternatively or additionally be used for other purposes. For example, the cylindrical element may be designed as a pipeline which, at one of the two end pieces, leads to a hydraulic connection and, within the hydraulic cylinder in the region of the opposite end piece, has an opening for hydraulic medium. The hydraulic connections of the cylinder/piston assembly can thus be arranged on the same end piece without the use of external lines, which can be advantageous in installation situations with limited space availability.

In one preferred embodiment, the cylinder/piston assembly is designed as a synchronous cylinder, in which the piston rod extends to both sides of the piston, and in which the two end pieces are designed as guide pieces, at each of which the piston rod is sealed.

In principle, the piston and piston rod(s) may be formed as a single piece or rigidly connected. A further advantage is however achieved if the piston rod is mounted rotatably on the piston, because in this case no torque is transmitted from the piston rod to the piston. This leads to a more uniform distribution of force and introduction of force between piston and cylinder.

Furthermore, in the case of hydraulic cylinders, it is commonly sought to use a position measuring system by means of which the position of the piston can be determined.

Internal position measuring systems, which are arranged within a centrally extending hollow piston rod, are known on the market. The space required for these results in a relatively large diameter of piston rod and cylinder, which in turn entails higher forces in the system. Furthermore, in the case of a central arrangement of piston rod and position measuring system, twisting of the piston rod would result in the maximum torque being introduced into the inner pipe with the position measuring system. An external position measuring system is of complex mechanical construction, sensitive to environmental influences, and, with regard to its accuracy, dependent on external forces, because bending of the piston rod can be introduced as an error into the measurement.

Here, the arrangement according to the invention having a tubular cylindrical element makes it possible to integrate an internal position measuring device, the accuracy of which is furthermore not dependent on external forces. It is preferable here, without the invention being limited to this, for the position measuring device to be designed as a magnetostrictive position measuring system or a position measuring system based on Hall sensors.

At least one of the end pieces may expediently be connected to the cylinder barrel by means of a flange connection, for example in the form of a union ring that engages over a collar. This allows for the fact that, owing to the cylindrical element that is anchored in both end pieces, the end pieces cannot be rotated independently of one another or relative to one another.

The other end piece may however be screwed onto or into the cylinder barrel in a conventional manner by means of a threaded connection. In the assembly process, the end piece that is screwed on or in may be installed first, then the piston and the cylindrical element may be inserted, and subsequently the open end of the cylinder barrel may be closed by means of the end piece that is fastened by means of a flange connection.

BRIEF DESCRIPTION OF THE DRAWINGS

Further properties and advantages of the invention will become apparent from the following description of exemplary embodiments on the basis of the figures, in which.

DETAILED DESCRIPTION

Figure 1:
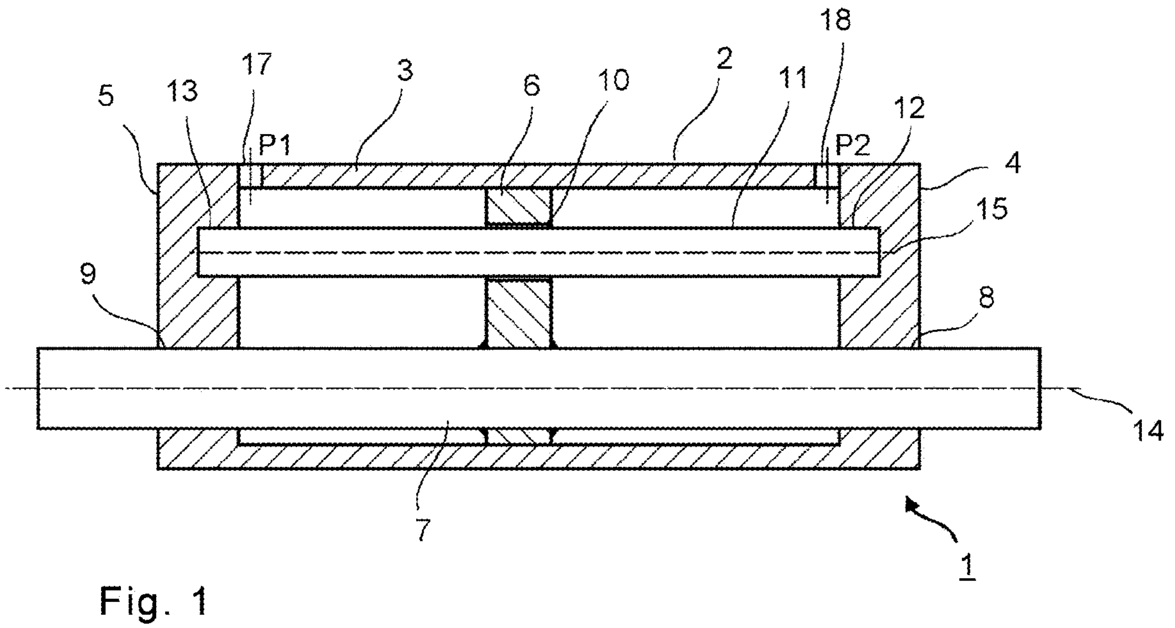
FIG. 1 shows a first exemplary embodiment of a cylinder/piston assembly designed as a synchronous cylinder, having an eccentric piston rod and having a rod as a torque support extending parallel to the piston rod.

The cylinder/piston assembly 1 shown in FIG. 1 comprises a hydraulic cylinder 2 having a cylinder barrel 3 which is closed at both sides by in each case one end piece 4, 5. Situated within the hydraulic cylinder 2 is a longitudinally movable piston 6 which is mounted sealingly and slidingly with respect to the cylinder internal wall by means of corresponding piston seals (not shown) of known design. A piston rod 7 extends to both sides of the piston 6, such that the cylinder/piston assembly 1 acts as a synchronous cylinder. Correspondingly, the two end pieces 4, 5 are designed as guide pieces and each have a through bore 8, 9, equipped with a rod seal (not shown) of known design, for the piston rod 7.

It is essential here that the piston rod 7 and the two through bores 8, 9 for the piston rod 7 are arranged in the guide pieces 4, 5 along an axis 14 which is eccentric with respect to the cylinder barrel 3 or the central axis thereof.

By virtue of the piston rod 7 being arranged offset within the available circular cross section of the cylinder barrel 3, a second bore 10 can be accommodated in the piston 6 in the region of the eccentricity, which second bore is closed by means of a cylindrical element 11. In the first exemplary embodiment, a rod 11 is shown as a cylindrical element, which rod extends through the piston 6 along a second axis 15 which is eccentric with respect to the cylinder barrel 3 and parallel to the first axis 14. The rod 11 is inserted into blind bores 12, 13 which are arranged, along the second axis 15, on the inner sides of the guide pieces 4, 5, and is thus anchored rotationally fixedly with respect to a rotation of the piston 6 in the cylinder barrel 3. The rod 11 is sealingly mounted in the associated bore 10 in the piston 6 by means of a conventional rod seal (not shown), such that the piston 6 is movable in the longitudinal direction along the rod 11. The rod 11 thus serves as an anti-rotation means and a torque support for the piston 6.

The two cylinder chambers that are separated from one another by the piston 6 can be charged with hydraulic oil, in order to move the piston 6 within the cylinder barrel, via lateral bores 17, 18 in the cylinder barrel 3, which serve as hydraulic connections P1, P2 and which for this purpose may be equipped for example with a threaded connection (not shown).

A further improvement with regard to the introduction of force via the piston rod 7 is achieved by virtue of the piston rod 7 being mounted, by means of a rotary bearing 16, rigidly in the movement direction but freely rotatably in the rotational direction relative to the piston 6. This is shown by way of example in FIG. 5. The rotatable mounting of the piston rod relative to the piston 6 improves the decoupling of a torque, which is introduced from the outside via the piston rod 7, from the components of the hydraulic cylinder 2 such as cylinder barrel 3, piston 6, piston rings and piston seal.

Figure 2:
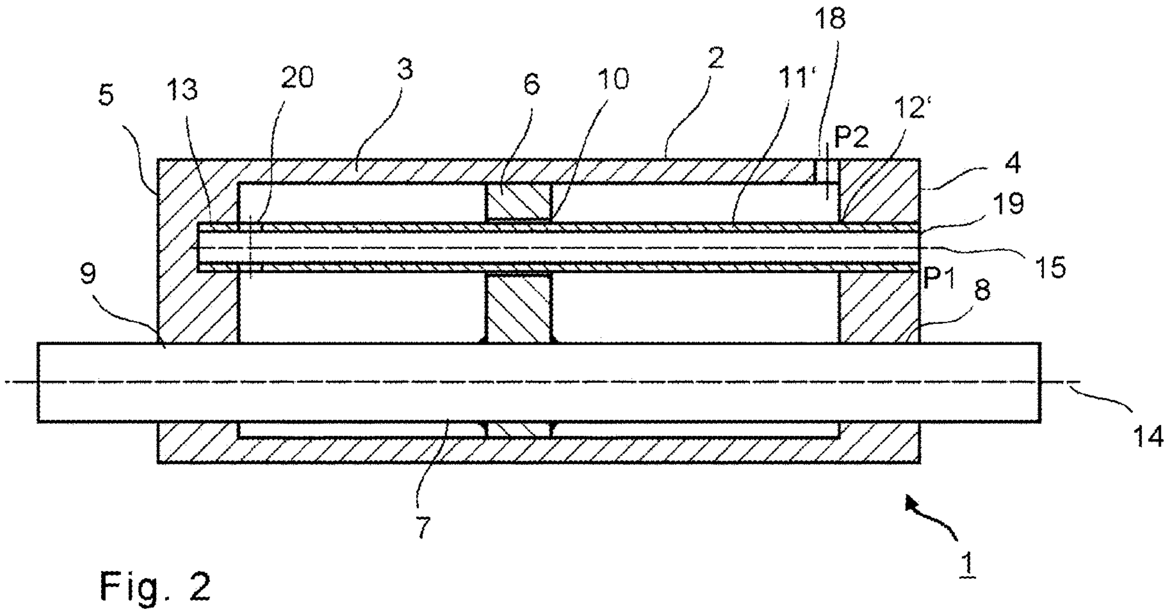
FIG. 2 shows a second exemplary embodiment of a cylinder/piston assembly, having an eccentric piston rod and having a pipeline for hydraulic oil extending parallel to the piston rod.

In FIG. 2, as a cylindrical element, a pipe 11' rather than a rod is inserted as a cylindrical element into the hydraulic cylinder 2, which pipe extends along the axis 15 through the bore 10 in the piston 6. The pipe 11' also provides torque support, but can additionally be used as an oil line for hydraulic oil to the left-hand cylinder chamber, which is closed by the guide piece 5. For this purpose, the bore 12' in the guide piece 4 is formed not as a blind bore but as a through bore, the outwardly facing opening 19 of which serves as a hydraulic connection P1 and, for this purpose, may be equipped for example with a threaded connection (not shown). In the region a short distance before the pipe 11' ends in the blind bore 13 of the guide piece 5, a transverse bore 20 is formed in the pipe 11', through which transverse bore hydraulic oil can flow via the connection P1 and the pipe 11' from and to the left-hand cylinder chamber in the drawing. As in FIG. 1, the second hydraulic connection P2 of the hydraulic cylinder 2 is formed by a lateral bore 18 in the cylinder wall.

Figure 5:
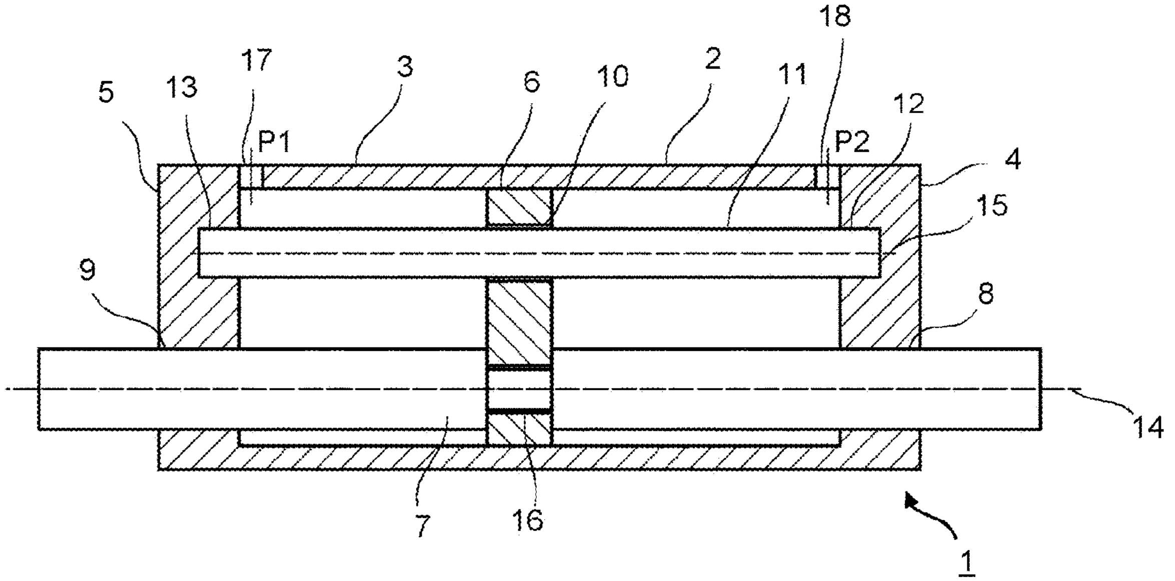
FIG. 5 shows an exemplary embodiment corresponding to that shown in FIG. 1, with the piston rod additionally mounted rotatably in the piston.
Figure 6:
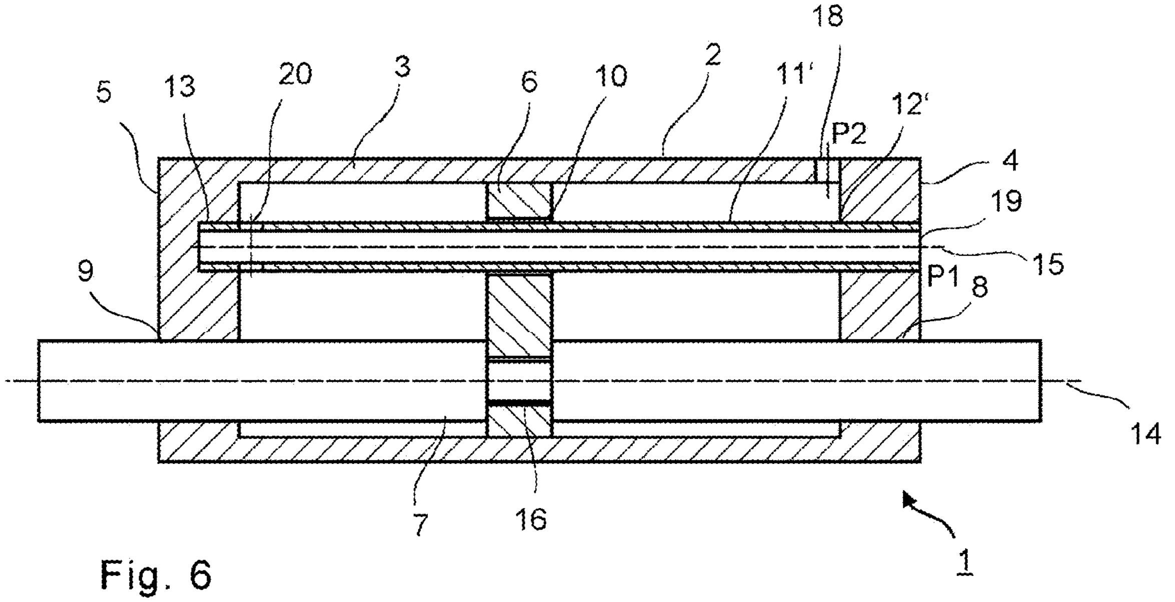
FIG. 6 shows an exemplary embodiment corresponding to that shown in FIG. 2, with the piston rod additionally mounted rotatably in the piston.

A refinement in which the piston rod 7 is mounted rotatably relative to the piston 6 by means of a rotary bearing 16 is shown by way of example in FIG. 5.

Figure 3:
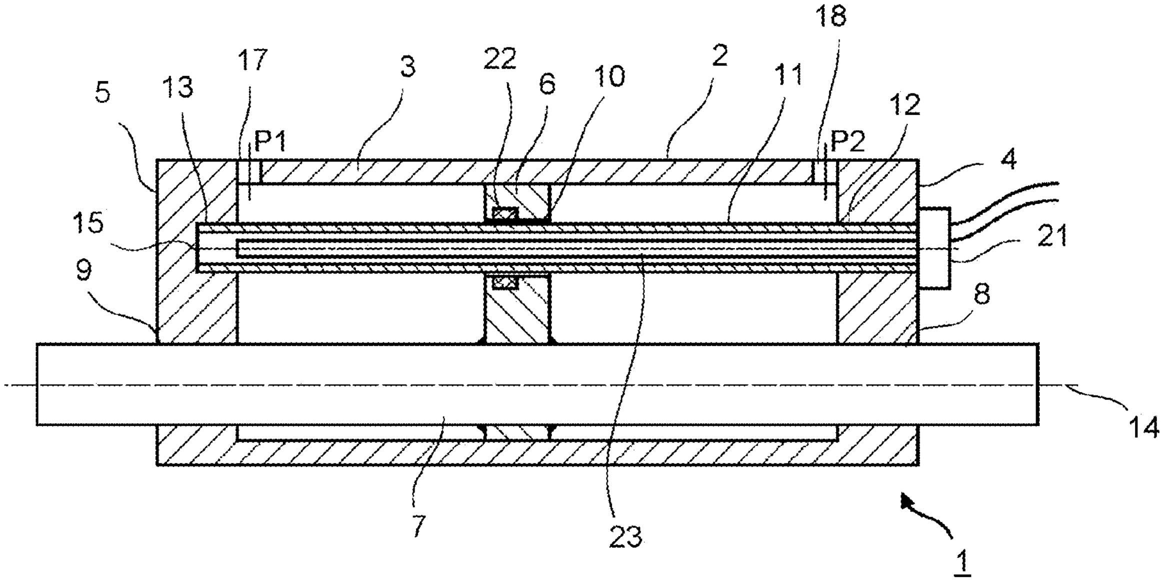
FIG. 3 shows a third exemplary embodiment of a cylinder/piston assembly, having an eccentric piston rod and having a position measuring system arranged in a pipe extending parallel to the piston rod.

In the exemplary embodiment shown in FIG. 3, the pipe 11' does not serve as an oil line but receives a position measuring device 21. The position measuring device 21 is a magnetostrictive position transducer that determines the position of a permanent magnet 22 that is arranged around the bore 10 in the piston 6. Such magnetostrictive position transducers are known per se. A sensor rod 23 is formed as a magnetically soft waveguide. A short current pulse is conducted through an internal wire in the sensor rod 23, which current pulse generates a circular magnetic field which is concentrated in the waveguide owing to the magnetically soft properties of said waveguide. At the position of the permanent magnet 22, which serves as a position encoder, a magnetic field is generated, the field lines of which extend at right angles to the pulse magnetic field and are also concentrated in the waveguide. In the region of the waveguide, where the two magnetic fields are superposed, an elastic deformation arises owing to magnetostriction, generating a mechanical wave which in turn can be converted by a signal converter into an electrical signal. From the propagation time of the response signal, that is to say the time between the emission of the current pulse and receipt of the magnetostrictive echo, the distance to the position encoder can be determined.

In the context of the invention, aside from a magnetostrictive measuring system, other measuring methods may also be used. For example, an arrangement of Hall sensors may be used in order to detect a magnetic position encoder arranged on the piston. Aside from this, acoustic or optical position measuring methods may also be used, for example by virtue of a position encoder within the pipe 11' being pulled along by a permanent magnet arranged on the piston, on which position encoder a signal can be reflected and measured as a response signal.

The eccentric arrangement of a position measuring system in the support pipe 11' that is separate from the piston rod 7 has the effect that the piston rod and thus the cylinder barrel can, for the same force requirements, be designed to have smaller diameters.

Figure 7:
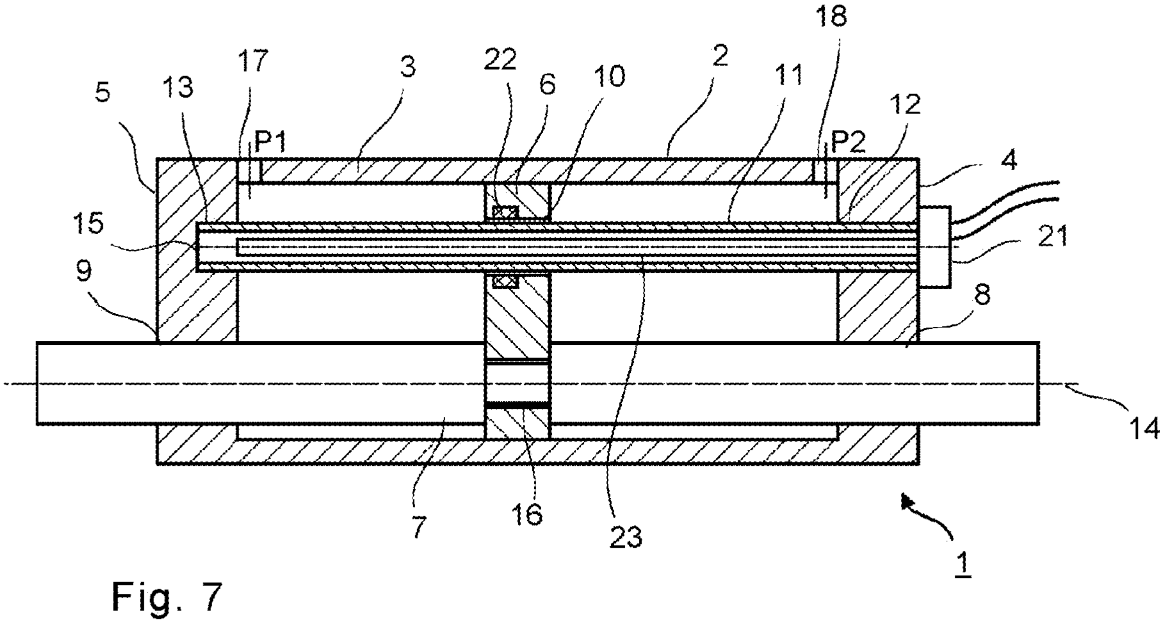
FIG. 7 shows an exemplary embodiment corresponding to that shown in FIG. 3, with the piston rod additionally mounted rotatably in the piston.

A refinement of the third exemplary embodiment, in which the piston rod 7 is again mounted rotatably relative to the piston 6 by means of a rotary bearing 16, is shown by way of example in FIG. 7.

Figure 4:
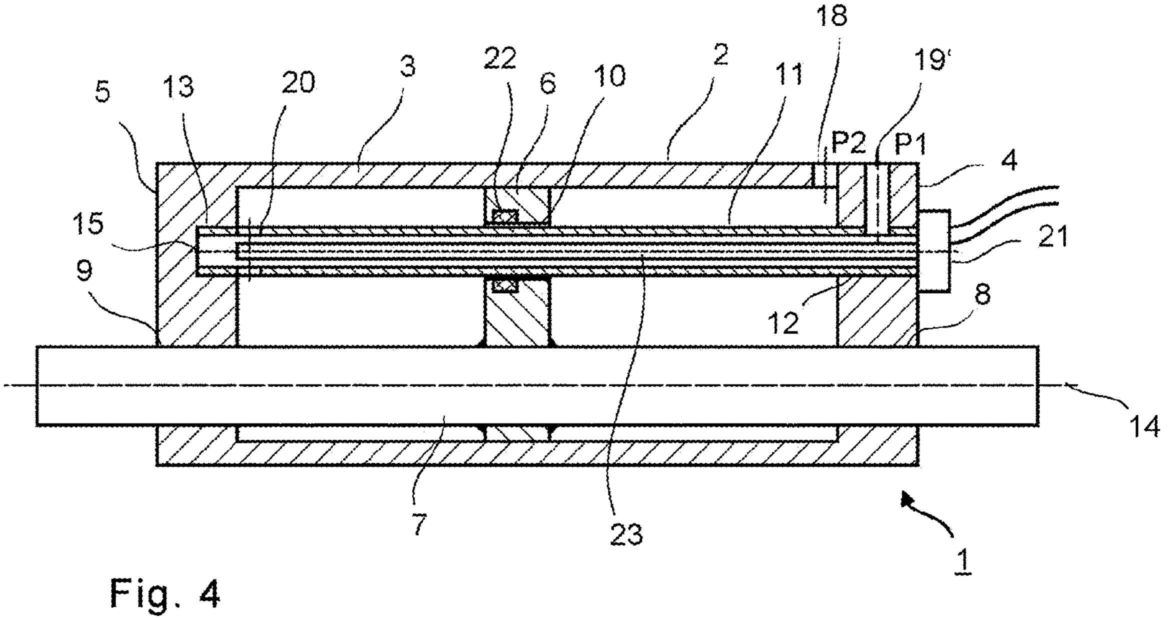
FIG. 4 shows a fourth exemplary embodiment of a cylinder/piston assembly, which has an eccentric piston rod and in which a pipe extending parallel to the piston rod serves both as an oil line and for accommodating a position measuring system.

Finally, in the fourth exemplary embodiment shown in FIG. 4, the pipe 11' serves both as an oil line to the remote cylinder chamber and for accommodating a position measuring system 21. Here, because the opening of the bore 12 is occupied by the position measuring system 21 and its signal converter, the hydraulic connection P1 to the pipe 11' is formed by a radially extending bore 19' in the guide piece 4, which bore is drilled laterally into the pipe 11'.

Figure 8:
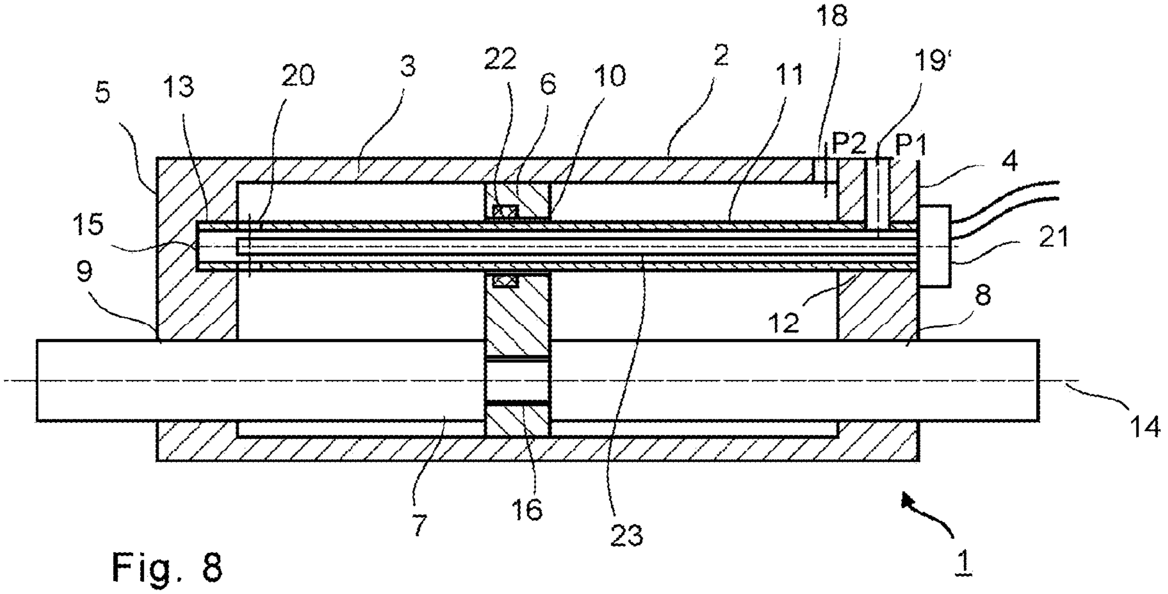
FIG. 8 shows an exemplary embodiment corresponding to that shown in FIG. 4, with the piston rod additionally mounted rotatably in the piston.

A refinement of the fourth exemplary embodiment, in which the piston rod 7 is again mounted rotatably relative to the piston 6 by means of a rotary bearing 16, is shown by way of example in FIG. 8.

The invention claimed is:

1. A cylinder/piston assembly comprising:

a hydraulic cylinder (2) and a piston (6) which is sealingly mounted and longitudinally movable within the hydraulic cylinder (2);

a piston rod (7) on at least one side of the piston (6);

the hydraulic cylinder (2) has a cylinder barrel (3) of circular cross section which is closed at both sides by in each case one end piece (4, 5);

the piston rod (7) extends along a first axis (14) that is eccentric with respect to the cylinder barrel (3);

a cylindrical element (11, 11') anchored on the two end pieces (4, 5), the cylindrical element (11, 11') extends through the piston (6) along a second axis (15) which is eccentric with respect to the cylinder barrel (3) and parallel to the first axis (14); and a position measuring device (21) arranged within the cylindrical element (11'), wherein the cylindrical element (11') is tubular.

2. The cylinder/piston assembly as claimed in claim 1, wherein the cylinder/piston assembly is formed as a synchronous cylinder in which the piston rod (7) extends to both sides of the piston (6), and the two end pieces (4, 5) comprise guide pieces, at each of which the piston rod (7) is sealed.

3. The cylinder/piston assembly as claimed in claim 1, wherein the piston rod (7) is mounted rotatably on the piston by a rotary bearing (16).

4. The cylinder/piston assembly as claimed in claim 1, wherein the cylindrical element (11, 11') serves as a torque support for the piston (6) with respect to the hydraulic cylinder (2).

5. The cylinder/piston assembly as claimed in claim 1, wherein the cylindrical element (11') comprises a pipeline which, at one of the two end pieces (4), leads to a hydraulic connection (19, 19', P1) and, within the hydraulic cylinder (2) in a region of an opposite one of the end pieces (5), has an opening (20) for hydraulic medium.

6. The cylinder/piston assembly as claimed in claim 1, wherein the position measuring device (21) comprises a magnetostrictive position measuring system or a position measuring system based on Hall sensors.

7. A cylinder/piston assembly comprising:

a hydraulic cylinder (2) and a piston (6) which is sealingly mounted and longitudinally movable within the hydraulic cylinder (2);

a piston rod (7) on at least one side of the piston (6);

the hydraulic cylinder (2) has a cylinder barrel (3) of circular cross section which is closed at both sides by in each case one end piece (4, 5);

the piston rod (7) extends along a first axis (14) that is eccentric with respect to the cylinder barrel (3); and a cylindrical element (11, 11') anchored on the two end pieces (4, 5), the cylindrical element (11, 11') extends through the piston (6) along a second axis (15) which is eccentric with respect to the cylinder barrel (3) and parallel to the first axis (14), and a rotary bearing (16) by which the piston rod (7) is mounted rotatably on the piston.

8. The cylinder/piston assembly as claimed in claim 7, wherein the cylinder/piston assembly is formed as a synchronous cylinder in which the piston rod (7) extends to both sides of the piston (6), and the two end pieces (4, 5) comprise guide pieces, at each of which the piston rod (7) is sealed.

9. The cylinder/piston assembly as claimed in claim 7, wherein the cylindrical element (11, 11') serves as a torque support for the piston (6) with respect to the hydraulic cylinder (2).

* * * * *